United States Patent

Rittenbach

[15] 3,670,331

[45] June 13, 1972

[54] SCANNING MEANS AND METHOD FOR SEARCH RADAR

[72] Inventor: Otto E. Rittenbach, Neptune, N.J.

[73] Assignee: The United States of America as represented by the Secretary of the Army

[22] Filed: July 16, 1970

[21] Appl. No.: 55,499

[52] U.S. Cl............................343/11 R, 343/100 SA
[51] Int. Cl..................................................G01s 9/06
[58] Field of Search.................343/11 R, 100 SA

[56] References Cited

UNITED STATES PATENTS 3,266,010   8/1966   Brightman et al............343/100 SA X
3,364,484   1/1968   Best..............................343/11 R X

*Primary Examiner*—T. H. Tubbesing
*Attorney*—Harry M. Saragovitz, Edward J. Kelly, Herbert Berl and Gordon W. Kerr

[57] ABSTRACT

According to this invention, an electronically scanned radar antenna array is rapidly scanned over a plurality of adjacent beam positions, to avoid the possibility of fast-moving targets escaping detection. The radar PRF is increased to yield the same unambiguous range and target echo sensitivity compared to a slow-scan system. In a modification of this concept, rapid interlaced scanning is provided to reduce the probability of second-time-around echoes entering adjacent beam positions.

8 Claims, 6 Drawing Figures

SCANNING MEANS AND METHOD FOR SEARCH RADAR

The invention described herein may be manufactured, used, and licensed by or for the Government for governmental purposes without the payment to me of any royalty thereon.

This invention relates to search radar and more particularly to an improved method of scanning such a radar, and also apparatus for accomplishing such improved scanning. Prior art slow-scan search radars typically dwell for many radar pulses in each beam position, due to the slow-scan rate resulting from the inertia of moveable antennas. Also, integration of a plurality of echoes from the same target greatly enhances the detection probability. As an example of such a prior art scanning system assume that a radar with a pulse repetition frequency (PRF) of 3,000 per second scans either with continuous or step motion over a sector of 10 antenna beamwidths, with 1,000 pulses emitted at each beam position. Such a radar leaves each beam position uncovered or unilluminated for 90 percent of the time or 3 seconds. Fast moving targets can sneak through one or more of the unilluminated beam positions during this period. In order to obviate such possibility, the present invention contemplates a radar with a rapidly scanned antenna with no moving parts in which the beam direction is electronically changed for each transmitted pulse. After each beam position has been illuminated once, the cycle repeats. In order to obtain the same or better target detection probability as in the prior art system mentioned above, the PRF must be increased by a factor equal to the number of beam positions of the prior art system. Thus, the PRF of the slow-scan system discussed above would be increased tenfold to 30,000 per second. Thus each beam position individually is illuminated 3,000 times per second, yielding detection probability equal or better than that of the slow-scan system, but the entire sector is scanned more often, providing better sector coverage. Since the PRF of each beam position is the same as the overall PRF of the prior art system, integration of target echoes can be utilized to achieve the same or better detection probability as with the prior art system. In a modification of this concept, interlaced rapid scanning is provided whereby the antenna illuminates every other beam position and the sector comprises an even number of beam positions, so that on the second half of the scanning cycle, the positions which were skipped on the first half cycle are illuminated. This technique greatly reduces the probability second-time-around echoes entering the side lobes of adjacent beam positions.

It is thus an object of this invention to provide an improved method and apparatus for scanning a search radar.

Another object is to prevent fast-moving targets from escaping detection by a search radar.

A further object is to provide electronically scanned search radar, in which second-time-around echoes from adjacent beam positions are greatly attenuated.

These and other objects and advantages of the invention will become apparent from the following detailed descriptions and drawings, in which.

Figure 1:
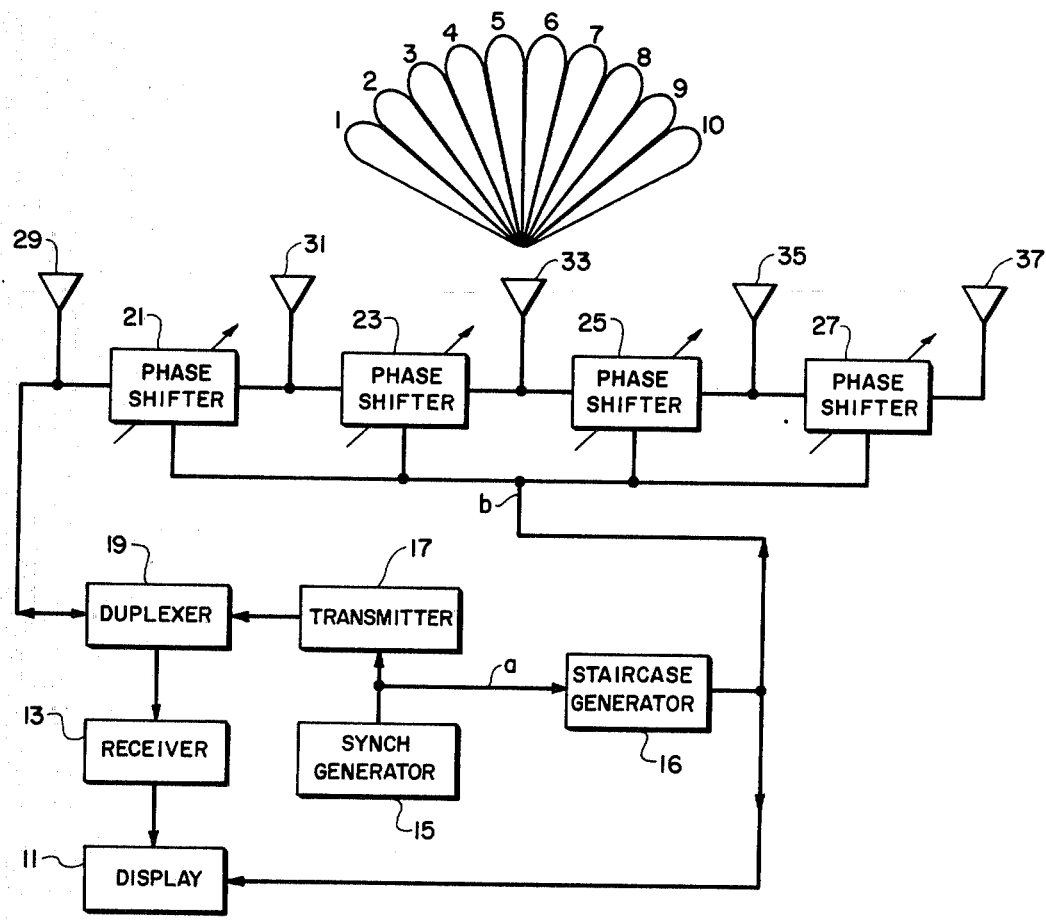
FIG. 1 is a block diagram of a preferred embodiment of the invention.
Figure 2:
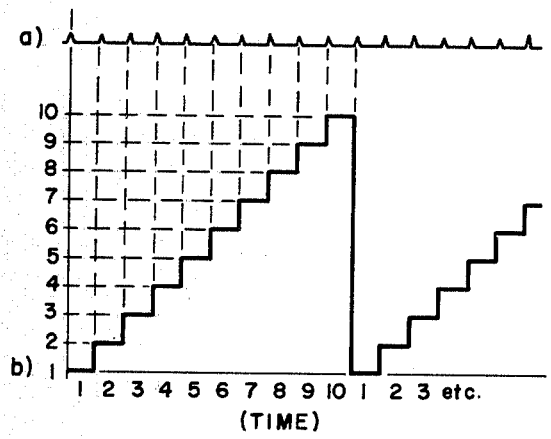
FIG. 2 shows waveforms related to the circuit of FIG. 1.

The search radar of FIG. 1 includes an electronically scanned phased antenna array comprising five individual antennas 29, 31, 33, 35 and 37, each antenna is connected to the adjacent one via automatically controllable phase shifters 21, 23, 25 and 27. This type of array is called series-fed. All of the phase shifters are identical and all introduce the same phase shift for any beam position. By changing the phase shift of all shifters in unison, the beam emitted by the array can be steered in different directions, for example for scanning purposes. The array is illustrated as scanning a sector including 10 beamwidths which are numbered 1 through 10 and are illustrated above the antenna array. The phase shifters all have their control inputs connected to the output of a staircase generator 16 via lead $b$. The voltage level on lead $b$ determines the amount of phase shift of each shifter. The remainder of the radar set is more or less conventional, comprising a transmitter 17 which is connected to the input of the antenna array via a duplexer 19. The receiver 13 receives echo signals via duplexer 19 and has a display 11, connected to its output. The synch generator 15 produces a pulse train at the radar PRF which triggers the transmitter and also the staircase generator. The output of the staircase generator is applied in parallel to the control inputs of the phase shifters, to vary the phase shift of each phase shifter in unison and is also connected to the display for synchronization purposes. The synch pulse generator output is shown at waveform $a$ of FIG. 2. The transmitter emits one microwave pulse for each synch pulse. The output of the staircase generator is shown at waveform $b$ of FIG. 2. As can be seen therein this waveform comprises 10 steps, each step coinciding with a synch pulse. There are 10 steps, one for each beam position. The steps corresponding to the beam positions are indicated by the numbers along the coordinate axes of waveform $b$ of FIG. 2. The voltage levels of the staircase generator are chosen so that the antenna beam is shifted by one beamwidth each time that the staircase generator advances to a new step. Thus the beam is shifted one position or beamwidth for each transmitted pulse, in accordance with the novel method, and after the sector has been scanned once, the transmitted pulse returns to the initial beam position 1, and the cycle repeats. The advantages of this method and apparatus were discussed above.

Figure 3:
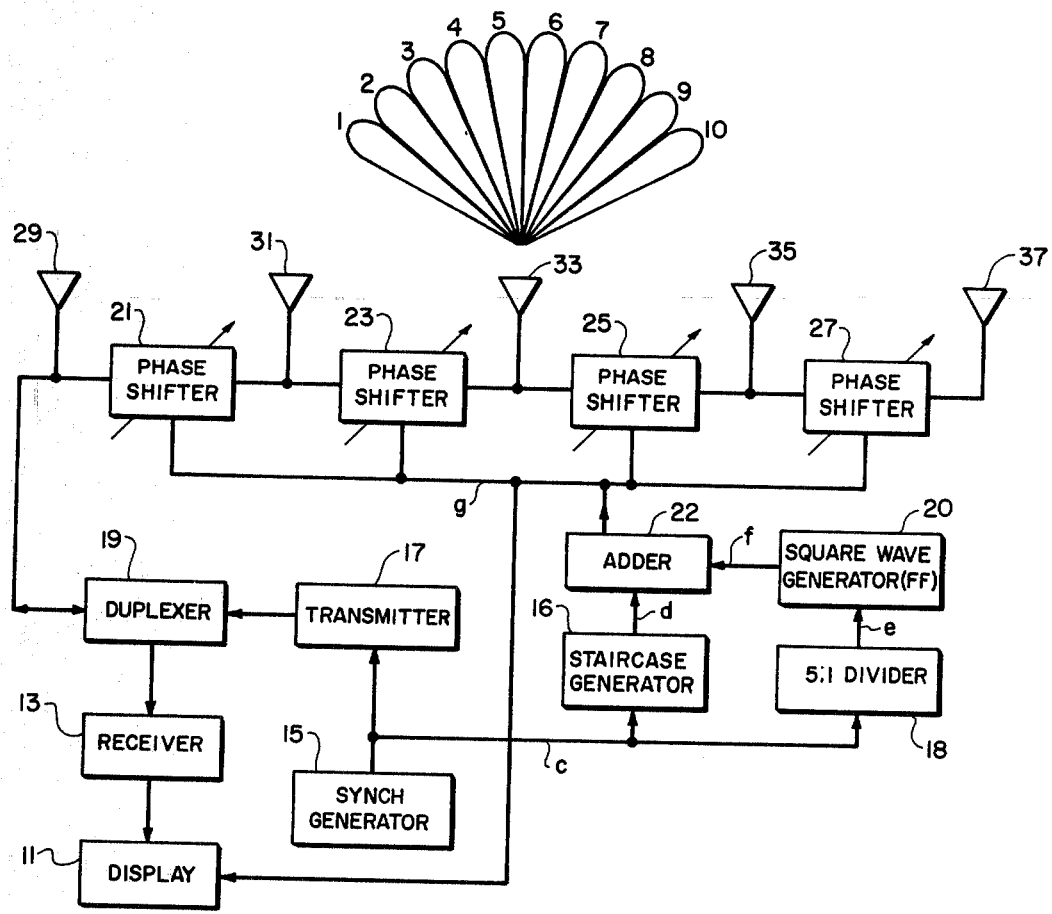
FIGS. 3 and 4 are respectively an alternate embodiment and waveforms related thereto.
Figure 5:
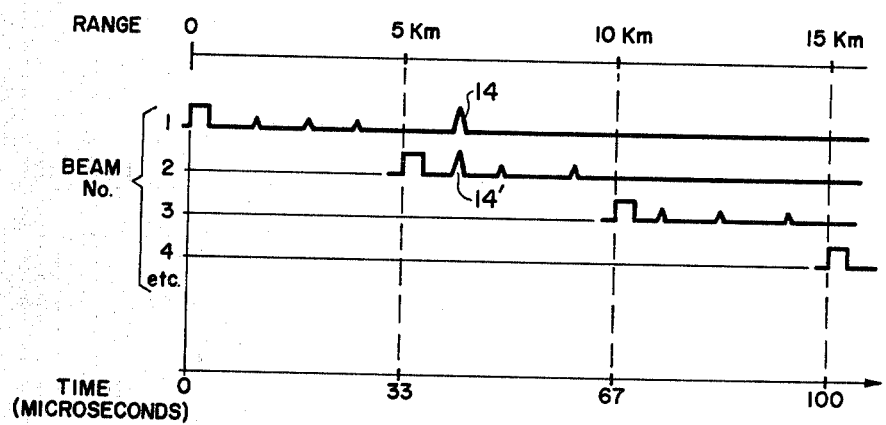
FIG. 5 are waveforms illustrating interference or crosstalk between adjacent beams.

The alternate embodiment of FIG. 3 incorporates generally the same concept as that of FIG. 1 but is designed to eliminate or greatly reduce interference or crosstalk between adjacent beam positions, which can occur with the previously described circuit and method. Assume as in the illustrative example above the PRF in FIG. 1 is 30,000 per second. This results in a PRF of 3,000 per second for each individual beam position, if all beams are free of interference or crosstalk. Interference can result from side lobes of any beam which overlap the main beam of any other beam. This is illustrated by the waveforms of FIG. 5 which shows transmitted pulses for several adjacent beams, and targets resulting therefrom, plotted as a function of both time and range. The square pulses are the transmitted pulses and the triangular pulses target echoes, the echoes from all targets in each position shown on the same horizontal line. Note the echo 14' in beam No. 2 at an apparent range of approximately 1 kilometer. This echo 14' actually results from a large target at a range of 6km within beam No. 1. This same target would produce echo 14 in beam No. 1, however since it is at a range of 6km, it arrives at the antenna array after the phase shifters have switched to beam position No. 2, and hence won't show up in the display in beam position No. 1. However, if beam No. 2 has a side lobe overlapping beam No. 1, the echo 14' will result, yielding an erroneous target echo indication. This problem is overcome by scanning every other or every second beam position. The amplitude of the side lobes decreases as one departs from the direction of the main lobe or beam, and by skipping the adjacent beam positions in the scanning sequence, the crosstalk described above is greatly reduced. The circuit of FIG. 3 shows novel circuitry for practicing this novel scanning method. This circuit is similar to that of FIG. 1 and in both figures corresponding circuit elements have the same reference numerals. The circuit of FIG. 3 includes a more complex circuit for generating the required staircase wave to effect the above-described interlaced scanning. The number of beam positions is selected as an even number and the staircase generator 16 is arranged to have a number of steps equal to half of the number of beam positions. The staircase generator is triggered by each synch pulse via lead $c$, as in FIG. 1, and in addition a divider 18 is also triggered by the synch pulses, shown in waveform $c$ of FIG. 4 and divides the PRF by half the number of beam positions. The output of divider 18 is shown in waveform $e$ of FIG.

Figure 4:
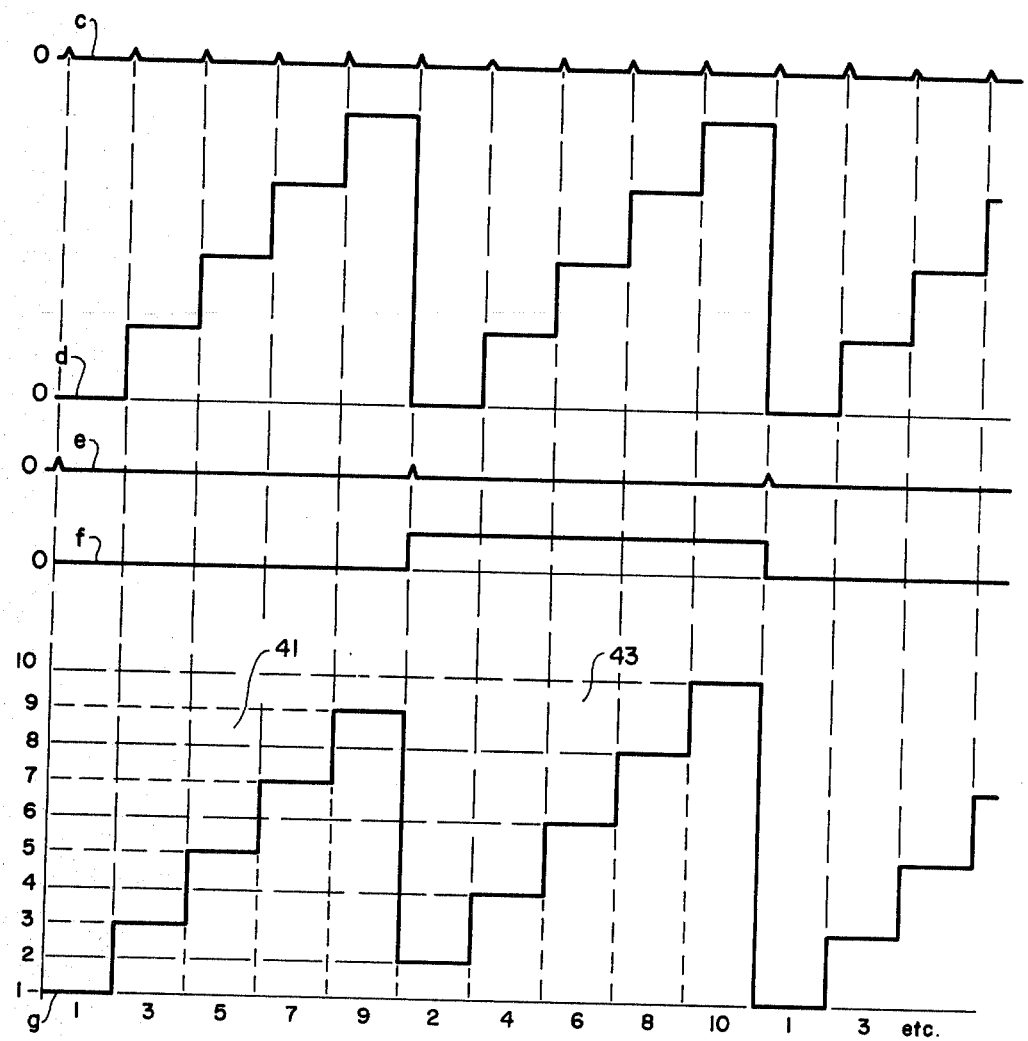

4. It can be seen that the divided pulses of waveform *e* of FIG. 4 coincide with the beginning of each five-step waveform from generator 16. The output of divider 18 triggers a square wave generator 20, which may be a flip flop. The output of generator 20 is shown at waveform *f* of FIG. 4. It can be seen that this waveform has the same level or voltage during every second staircase put out by generator 16, thus the first and third staircases from 16 coincide with the zero or lower voltage level of square wave generator 20, while the second and fourth staircases coincide with the positive or upper voltage level of generator 20. Thus the repetition frequency of generator 20 is half that of the staircase generator with the square wave transitions coinciding with the beginning of each staircase. The square wave and the staircase waveforms are both applied to an adder 22 which may comprise a simple resistor matrix for adding the voltage levels of each of its inputs to yield the composite or sum waveform *g* of FIG. 4. It can be seen that this waveform comprises a staircase in two sections, 41 and 43. The second section 43 is vertically offset from the first by the positive voltage level of the square wave generator, so that the voltage levels of the second section 43 fall halfway between those of the first section 41. The composite waveform now contains 10 levels or twice as many as the output of generator 16 and the levels are properly related so that when the waveform *g* of FIG. 4 is applied to the control input of the phase shifters, the desired interlaced scanning will result. It can be seen that the scanning sequence is as follows: 1, 3, 5, 7, 9, 2, 4, 6, 8, 10; 1, 3, 5, etc. The waveform *g* of FIG. 4 is also applied to the display 11 for synchronizing purposes.

It can be seen that the described technique comprises a rather simple and novel solution to the problem of the detection of fast-moving targets and to adjacent beam interference.

More than one beam position may be skipped to further attenuate adjacent beam interference, if this is found necessary.

Figure 6:
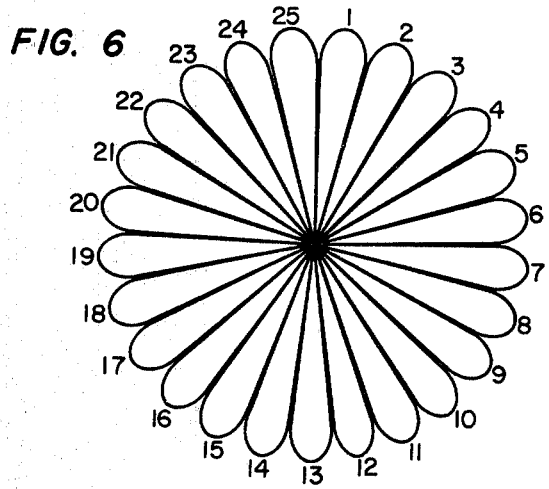
FIG. 6 shows an alternate way of implementing interlace scanning.

FIG. 6 illustrates how interlaced scanning can be utilized with a radar which scans over 360° of azimuth with an antenna, the beam of which moves continually or stepwise in the same direction. The number of beam positions is made an odd number, for example, FIG. 6 shows 25 beam positions and every second beam position is skipped. Thus, the scanning sequence may be as follows: 1, 3, 5, 7, 9, 11, 13, 15, 17, 19, 21, 23, 25, 2, 4, 6, 8, 10, 12, 14, 16, 18, 20, 22, 24, 1, 3, etc.

While the invention has been described in connection with illustrative embodiments, obvious modifications thereof will occur to those skilled in the art, hence the invention should be limited only by the scope of the appended claims.

What is claimed is:

1. A search radar of the pulse type comprising, an electronically scanned antenna having a plurality of adjacent beam positions, and means to electronically shift the beam of said antenna at the same rate as the pulse repetition frequency of said radar, whereby a single transmitter pulse is emitted at each beam position for each scanning cycle thereof.

2. The radar of claim 1 wherein the beam of said antenna is scanned such that the antenna beam shifts to the next adjacent position with each transmitter pulse, and returns to the starting beam position after all positions have been illuminated once.

3. The radar of claim 1 wherein the beam of said antenna is scanned over a sector such that the antenna beam skips every other beam position and the number of beam positions is even, whereby interlaced scanning results.

4. The radar of claim 2 wherein said antenna comprises a plurality of individual antennas connected by controllable phase shifters, and a staircase generator having its output connected to the control inputs of said phase shifters, the number of steps of said staircase generator being equal to the number of beam positions of said antenna.

5. The radar of claim 3 wherein said antenna comprises a plurality of individual antennas connected by controllable phase shifters, and a staircase generator having half the number of steps as said antenna has beam positions, means to add a square wave with a period equal to the scanning period of said antenna to the output of said staircase generator, and means to apply the resulting sum waveform to the control input of said phase shifters.

6. The method of scanning a search radar, comprising the steps of, electronically shifting the beam position of the antenna thereof with each transmitted pulse and making the pulse repetition frequency high enough so that each individual beam position has a sufficiently high pulse repetition frequency so that target echo integration can be utilized to enhance target detection probability, whereby said search radar is capable of detecting fast-moving targets.

7. The method of scanning a pulse-type search radar, comprising the steps of, electronically shifting the beam position of the antenna thereof by two beamwidths with each transmitted pulse, the scanning cycle containing an even number of beam positions, and making the pulse repetition frequency high enough so that each individual beam position has a sufficiently high pulse repetition frequency so that target echo integration can be utilized to enhance target detection probability, whereby said search radar is capable of detecting fast-moving targets.

8. The method of interlaced scanning of a search radar, the antenna of which scans over 360° of azimuth, comprising the steps of, dividing the azimuthal coverage of said antenna into an odd number of beam positions and then skipping every second beam positions in the scanning cycle, the antenna beam moving unidirectionally.

* * * * *